May 14, 1957  F. B. LENZ ET AL  2,792,116

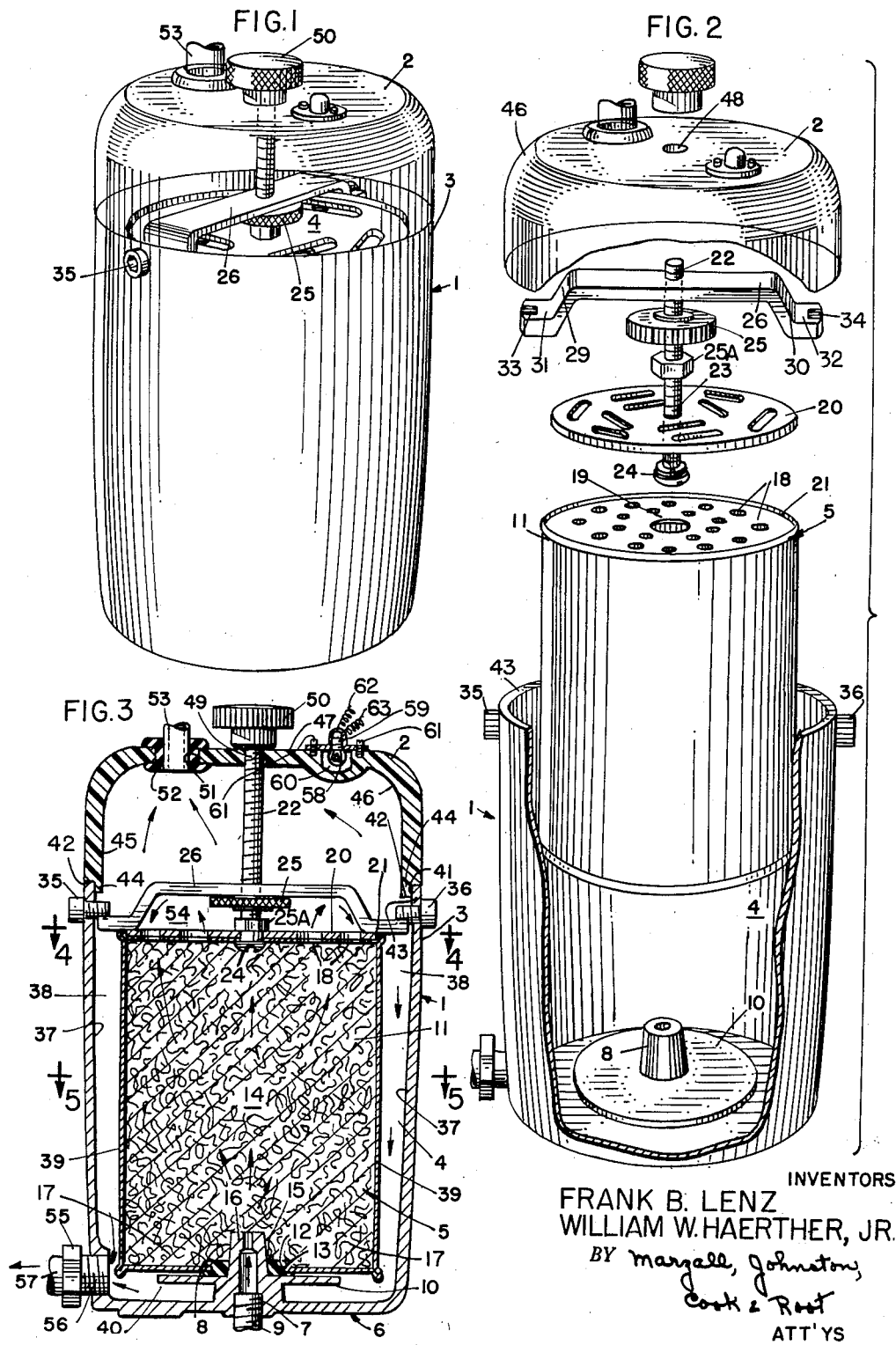

OIL FILTER

Filed Oct. 12, 1953  2 Sheets-Sheet 2

INVENTORS:
FRANK B. LENZ
WILLIAM W. HAERTHER, JR.
BY Marshall, Johnston,
Cook & Root
ATT'YS United States Patent Office 2,792,116
Patented May 14, 1957

2,792,116
OIL FILTER

Frank B. Lenz, St. Charles, and William W. Haerther, Jr., Geneva, Ill.

Application October 12, 1953, Serial No. 385,418
3 Claims. (Cl. 210—94)

This invention relates to an oil filter, and more particularly to the type of oil filter used in connection with an internal combustion engine such as an automotive engine for filtering oil in the engine oil circulatory system.

One object of the invention is to provide an oil filter for the removal of foreign solid matter from the oil circulating in a lubrication system.

A further object is to provide a filter of the type described which distills and removes condensates and vapors from the oil.

Another object of the invention is the provision of a filter for the treatment of oil which prevents sludge formation in the oil.

A still further object of the invention is the provision of a new and improved oil filter wherein oil from a lubricant system is directed into the bottom of a filter element having solid heat conducting side walls upwardly through the element to a vapor removal chamber and thence downwardly along the outside of said side walls to an outlet to the main lubricant system.

Another object of the invention is the provision of an oil filter having a transparent dome providing a direct view of the oil circulating through the filter.

A further object of the invention is the provision of an oil filter so constructed as to permit ready removal and replacement of a separate removable filter element from the main filter housing.

Other objects and adavntages of the invention will become apparent upon reading the following description taken in conjunction with the accompanying drawing, in which:

Fig. 1 is a perspective view of an oil filter provided by the invention;

Fig. 2 is an exploded view of the parts comprising the filter shown in Fig. 1;

Fig. 3 is a vertical section through the filter shown in Fig. 1;

Figure 4:
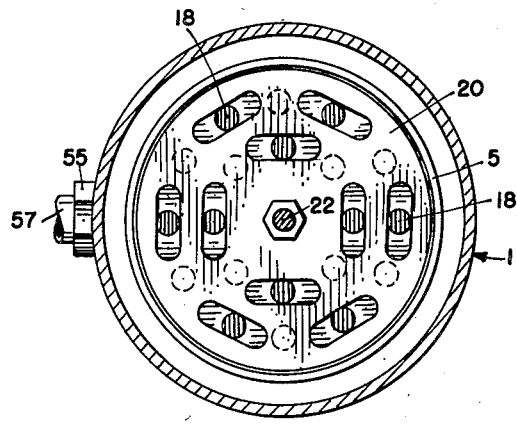
Fig. 4 is a horizontal section taken along the line 4—4 of Fig. 3.
Figure 5:
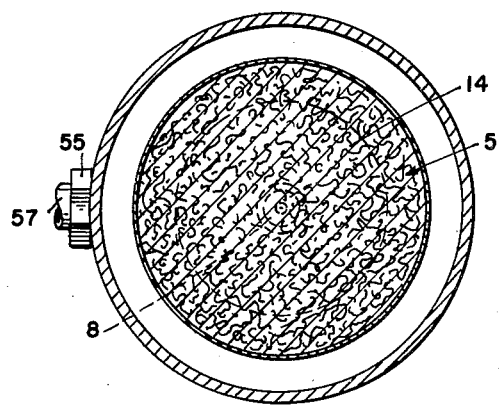
Fig. 5 is a horizontal section taken along the line 5—5 of Fig. 3.
Figure 6:
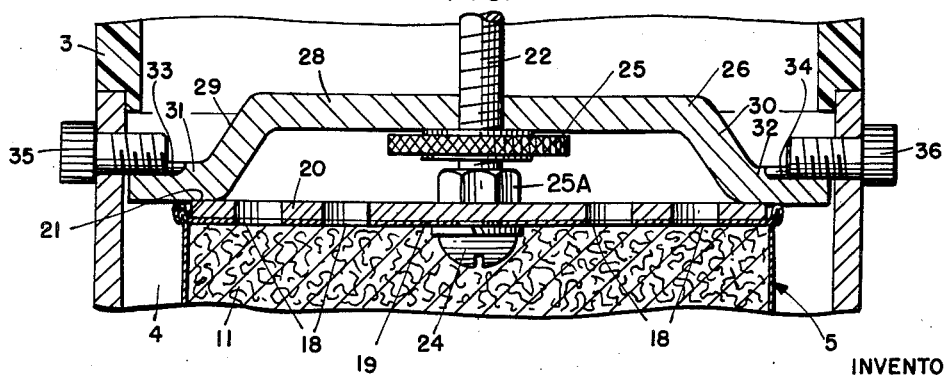
Fig. 6 is an enlarged detail view showing the relationship of the cover locking means to the filter element.

In accordance with the invention a filter construction is provided wherein oil from the engine is circulated into the bottom of a removable filter element and upwardly through a filtering medium into a space subjected to vacuum at which point vapors are removed. The filter element consists preferably of a filtering medium carried in a closed cylindrical metal can which has imperforate sides and perforations in both ends. This element is disposed within a housing with the walls of the can spaced from the inner surface of the walls of the housing to provide an annular cylindrical space. The hot oil flows over the outer surface of the sides of the can and additional vaporization of water and vaporizable components of the oil occur. The completely filtered oil flows from said annular space through the bottom of the housing of the filter into the engine circulatory system and the process is repeated continuously.

The oil filter illustrated in the drawings includes a housing 1 having a top end 3 on which is mounted a transparent cover 2. Disposed within the interior 4 of the housing 1 is a filter element 5.

Centrally of the bottom 6 is a threaded aperture 7 which extends through the nipple 8 and is adapted to make a threaded connection with a conduit 9 connected to the oil reservoir of the engine. The nipple 8 is preferably formed integrally with a filter element support flange 10.

A filter container 11, which is generally cylindrical, is mounted on support flange 10 and has an opening 12 at the bottom thereof with a sealing gasket or washer 13 therein adapted to fit tightly around nipple 8. The filtering material 14 is preferably a fibrous material (e. g., waste cotton in a cloth bag) capable of filtering out solids and the like from oil as it passes therethrough. Since the nipple 8 projects within the opening 12 for a substantial distance as at 16, a circular sump area 17 is provided to prevent the return of foreign matter accumulating in said area.

The upper end of the container 11 is provided with holes or perforations as at 18 and a centrally disposed opening 19. A perforated circular support plate 20 is positioned within the recess formed by the lip 21 of the container 11 that extends above the perforated container top. A threaded bolt 22 extends through an opening 23 of plate 20. The head 24 of the bolt 22 extends within the central opening 19 of the perforated top of the container 11. A knurled nut 25 and a nut 25A are threaded on the bolt 22 between the bracket 26 and plate 20.

The bracket 26 is composed of an arm 28 having legs 29 and 30. Each of the legs 29 and 30 is bent outwardly to form flanges 31 and 32, respectively. Flanges 31 and 32 are provided with shallow recesses 33 and 34, respectively.

The top end 3 of the housing is bored at diametrically opposed points to receive the screw members 35 and 36, the ends of which extend within the interior 4 of the housing and are adapted to rest partially within the recesses 33 and 34. When the recesses 33 and 34 are aligned with respect to the interiorly projecting ends of the screw members 35 and 36 the container 11 may be secured within the housing by an appropriate manipulation of the knurled nut 25. The nut 25A is previously set at the proper position so that the head 24 of the bolt 22 projects into the opening 19 of can 11. As the knurled nut 25 is rotated upwardly along the bolt 22 it engages the arm 28 of bracket 26. The entire bracket is thus directed upwardly so that the ends of the screw members 35 and 36 become firmly lodged within the recesses 33 and 34. Since the annular support plate 20 is secured to the bolt 22, manipulation of the knurled member 25 will also serve to secure the container within the housing. By reversing the rotation of knurled nut 25 the filter can 11 is released and can be removed and replaced easily.

When the container 11 is secured within the interior 4 of the housing it is substantially concentric to the walls 37 thereof so as to define the annular space 38 formed by the exterior walls 39 of the container 11 and the walls 37 of the housing. The space 38 is continuous with the space 40 disposed beneath the container and the bottom 6 of the housing.

The cover 2 is preferably formed of a transparent material (e. g., Plexiglas) having a stepped edge 41 whereby the shoulder 42 rests on the edge 43 of the top end 3 of the housing and the downward depending lip 44 extends within the interior 4 of the housing. The interior surface of the lip 44 of the cover 2 is a continuation of the plane of interior sides 45 of the cover. The cover is generally rounded at 46 and has a centrally disposed flat cover portion 47. An aperture is formed within the flat cover portion 47 through which the upper end 49 of bolt 22 extends. End 49 of bolt 22 receives the knurled nut 50 whereby cover 2 is securely positioned on the housing.

Between the aperture 48 and the rounded edge 46 of the cover 2 is an opening 51 having disposed therein a gasket or washer 52 which acts as a seal for a vapor exhaust tube 53. A novel but optional feature of the invention is the provision of a small electric bulb 58 (Fig. 3) mounted in a socket member 59 and extending into a recess 60 in the top 2. Socket member 59 is held in place by screws 61, 61 and wires 62 and 63 connect the bulb 58 to a source of electricity. Thus, the circulating oil can be examined visually.

In the operation of the filter, oil is directed from the main circulatory system of the engine through the aperture 7 at the bottom of the housing and thence via the nipple 8 into the filter media 14 disposed within the filter container 11. The oil flows upwardly as indicated by the directional arrows through the filter media and escapes from the filter can 11 through the apertures 18. At this point the oil is subjected to the effect of a vacuum whereby water, gases and vapors are removed via the tube 53 connected to the opening 51 at one end and to an air cleaner (not shown) at the other. In practice the tube 53 is constructed of clear neoprene.

Subsequent to the removal of the foreign gases and vapors, the oil flows downwardly along the walls 37 of the housing, the exterior walls 39 of the filter container 11 and in the space 38. The double-wall construction permits additional evaporation of the vaporizable materials carried by the oil, most of which will pass upwardly and out of the system through conduit 53. The filtered oil passes from the space 38 into the space 40 at the bottom of the housing and beneath the bottom of the filter container 11 to the oil exit aperture 55. A non-leak fitting 56 is threaded into the oil exit aperture 55 and a return tube 57 is secured thereto that conducts the oil into the main circulatory system. This tube, too, in practice, is preferably formed of clear neoprene.

An important feature of the invention is the provision of a container for the filter media or filter element in the form of a can having heat conducting side walls of metal or other suitable materials which act as heat exchange elements to cause vaporization of water and low boiling sludge forming distillates from the oil. It is believed that the clean oil obtained by the use of the present invention is due in part to the more complete removal from the oil of light petroleum fractions which might otherwise polymerize to form gums and other sludge-like materials. In the present invention the heat from the hot oil flowing through the filter can 11 increases the temperature of the sidewalls of the can and thereby increases the vapor formation and removal. The heat exchange is greater also due to the fact that the sides of the filter can are imperforate.

The oil filter of the invention enables effective filtration of oil thereby keeping the engine for which it is designed free from sludge and the like. Consequently the engine life is enhanced and the effectiveness of the oil is improved through use, in the absence of foreign substances and other accumulations.

In addition, the condition of the oil can be determined visually through the transparent cover. The filter device is so constructed that the filter media can be removed and replaced by fresh filter media simply by removing the entire filter can 11 and inserting a fresh filter can in its stead. Advantage is taken of the air cleaning structure provided in modern day vehicles in the vacuum removal of water and other vapors. The filter is so constructed that a sump area is provided wherein foreign bodies accumulate.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. An oil filter for the oil circulatory system of an internal combustion engine comprising a cylindrical housing having a central opening in the bottom thereof providing an inlet for oil to be filtered and another opening adjacent the bottom thereof providing an outlet for filtered oil, a removable cylindrical metal filter container having imperforate smooth sides and an imperforate bottom except for a central opening disposed within said housing, said filter container having an apertured top and the exterior thereof being sufficiently smaller than the interior of said housing to provide a free space between the exterior of said filter container and the interior of said housing, positioning means located at the bottom of said housing having an opening connecting the bottom of said housing with said central bottom opening of said filter container and adapted to extend into said container a short distance and support said container above the bottom of the inside of said housing sufficiently to permit oil passing through the free space between the outer side walls of said container and the inner side walls of said housing to flow through the oil outlet in said housing at the bottom thereof, a removable retaining member extending transversely of said housing across the top of said container and adapted to hold said container in place between said retaining member and said positioning means, said retaining member permitting oil flowing through the perforated top of said container to pass upwardly around said retaining member, a cover mounted on the top of said housing having an opening therein adapted to be connected to the engine exhaust and providing a vapor chamber formed between the top of said container and the inside of the top and sides of said cover, means associated with said transversely extending retaining member for holding said cover in place, said means also including means for exerting pressure against the top of the container to press said container against positioning means at the bottom of said housing, said transversely extending retaining member and said last named means all being removable from said housing to permit the removal of said container from said housing.

2. An oil filter as claimed in claim 1 in which said container has a recessed top and said means for exerting pressure against said top comprises an apertured circular plate adapted to fit within said recess at the top of said container and connected to a bolt extending through said retaining member and through the top of said cover, said bolt being provided with an adjusting nut between the top of said circular plate and the lower side of said retaining member and being provided at the outer end with means to hold said cover in place.

3. An oil filter as claimed in claim 1 in which said cover is provided with a recessed exterior portion containing an illuminating device adapted to transmit light through the cover to said vapor space to enhance the visual observation of the oil in said space.

References Cited in the file of this patent
UNITED STATES PATENTS

| | | |
|---|---|---|
| 594,695 | Hunter | Nov. 30, 1897 |
| 1,917,121 | Hughson | July 4, 1933 |
| 2,193,261 | Thomson | Mar. 12, 1940 |
| 2,193,480 | Eisler | Mar. 12, 1940 |
| 2,294,330 | Clark | Aug. 25, 1942 |
| 2,302,489 | Brown | Nov. 17, 1942 |
| 2,346,042 | Morris | Apr. 4, 1944 |
| 2,377,988 | Braun | June 12, 1945 |
| 2,388,821 | Braun | Nov. 13, 1945 |
| 2,428,939 | Morris | Oct. 14, 1947 |
| 2,460,888 | Koinzan | Feb. 8, 1949 |
| 2,647,633 | Greene | Aug. 4, 1953 |
| 2,661,848 | Gerhart | Dec. 8, 1953 |